United States Patent
Matsuno et al.

(10) Patent No.: US 9,193,591 B2
(45) Date of Patent: Nov. 24, 2015

(54) OZONE GAS GENERATOR AND METHOD FOR MANUFACTURING THE SAME

(75) Inventors: Takashi Matsuno, Hyogo (JP); Osamu Takemura, Hyogo (JP)

(73) Assignee: Sumitomo Precision Products Co., Ltd., Hyogo (JP)

( * ) Notice: Subject to any disclaimer, the term of this patent is extended or adjusted under 35 U.S.C. 154(b) by 0 days.

(21) Appl. No.: 13/499,675

(22) PCT Filed: Sep. 21, 2010

(86) PCT No.: PCT/JP2010/005718
§ 371 (c)(1),
(2), (4) Date: Mar. 30, 2012

(87) PCT Pub. No.: WO2011/039971
PCT Pub. Date: Apr. 7, 2011

(65) Prior Publication Data
US 2012/0189504 A1    Jul. 26, 2012

(30) Foreign Application Priority Data
Oct. 2, 2009   (JP) .................. 2009-230404

(51) Int. Cl.
*B01J 19/08* (2006.01)
*C01B 13/11* (2006.01)

(52) U.S. Cl.
CPC ............. *C01B 13/11* (2013.01); *C01B 2201/32* (2013.01); *C01B 2201/34* (2013.01); *C01B 2201/64* (2013.01); *C01B 2201/90* (2013.01)

(58) Field of Classification Search
CPC  C01B 13/11; C01B 2201/32; C01B 2201/34; C01B 2201/64; C01B 2201/90; C01B 2201/12; C01B 2201/60; C01B 2201/70; C01B 2201/80; C01B 2201/82; B01J 35/004; A61L 2/088
USPC .................................... 422/186.07
See application file for complete search history.

(56) References Cited

U.S. PATENT DOCUMENTS 6,046,533 A    4/2000  Nakatsuka
6,436,542 B1 *  8/2002  Ogino et al. ................. 428/432
(Continued)

FOREIGN PATENT DOCUMENTS

CA    2314381   *  7/2000
JP    01-242403 A    9/1989
(Continued)

OTHER PUBLICATIONS

International Search Report for corresponding International Application No. PCT/JP2010/005718 mailed Nov. 16, 2010.
(Continued)

*Primary Examiner* — Xiuyu Tai
(74) *Attorney, Agent, or Firm* — Renner, Otto, Boisselle & Sklar, LLP

(57) ABSTRACT

A dielectric 13 is provided on each of opposing surfaces of a pair of electrodes 14. Discharge gaps 20 communicating with a raw material gas supply path and an ozone gas removal path are formed between the pair of dielectrics 13. A functional film 17 is formed on each of the pair of dielectrics 13 so as to face the discharge gaps 20. The functional film 17 contains a first metal oxide of one or more metals selected from a group consisting of niobium, tantalum, molybdenum, and chromium, and a second metal oxide of one or more metals selected from a group consisting of titanium, tungsten, zinc, and iron.

6 Claims, 7 Drawing Sheets

(56) References Cited

U.S. PATENT DOCUMENTS

| | | | |
|---|---|---|---|
| 7,156,962 B2* | 1/2007 | Koizumi et al. | 204/292 |
| 2004/0223893 A1* | 11/2004 | Tabata et al. | 422/186.07 |
| 2005/0226791 A1 | 10/2005 | Wada et al. | |
| 2006/0049738 A1* | 3/2006 | Tabata et al. | 313/362.1 |
| 2006/0280660 A1* | 12/2006 | Weiss | 422/186.3 |
| 2008/0128269 A1 | 6/2008 | Matsuno | |
| 2010/0254868 A1* | 10/2010 | Obee et al. | 423/210 |

FOREIGN PATENT DOCUMENTS

| | | |
|---|---|---|
| JP | 05-290743 A | 11/1993 |
| JP | 08-031546 A | 2/1996 |
| JP | 11-278809 A | 10/1999 |
| JP | 2001-294406 A | 10/2001 |
| JP | 2004-315257 A | 11/2004 |
| JP | 3740254 | 11/2005 |
| JP | 2008-156218 A | 7/2008 |

OTHER PUBLICATIONS

Form PCT/ISA/237 for corresponding International Application No. PCT/JP2010/005718 dated Nov. 16, 2010.

Supplementary European Search Report for corresponding European Application No. 10820097.3 dated Oct. 24, 2013.

* cited by examiner

FIG.6

| MOLAR RATIO (Nb$_2$O$_5$/TiO$_2$) | OZONE CONCENTRATION (g/m$^3$(N)) |
|---|---|
| 0.003 | 15 |
| 0.010 | 80 |
| 0.030 | 250 |
| 0.075 | 290 |
| 0.150 | 320 |
| 0.301 | 345 |
| 0.601 | 340 |
| 1.202 | 330 |
| 3.006 | 310 |
| 9.018 | 305 |
| 30.060 | 290 |
| 300.602 | 250 |
| 3006.02 | 230 |

OZONE GAS GENERATOR AND METHOD FOR MANUFACTURING THE SAME

TECHNICAL FIELD

The present invention relates to an ozone gas generator suitable for generation of high-purity ozone gas, and to a method for manufacturing the ozone gas generator.

BACKGROUND ART

Recently, in semiconductor manufacturing facilities, ozone gas generators have been used in large quantities for, e.g., cleaning of silicon wafers. Since even mixing of slight impurities or foreign substances significantly influences productivity in the semiconductor manufacturing facilities, a high-purity ozone gas generating capacity is required for the ozone gas generators used therein. For the foregoing reason, it is required that high-purity oxygen gas (e.g., the degree of purity of equal to or higher than 99.9%) is used as raw material gas and even mixing of slight impurities into generated ozone gas is completely prevented.

For example, there is a possibility that, if an electrode is exposed to a discharge gap, impurities are mixed into gas through a surface of the electrode. Thus, typically in a discharge cell of the ozone gas generator, e.g., an alumina dielectric is provided between the electrode and the discharge gap so that the electrode is not exposed to the discharge gap.

However, there is a problem that, if the mixing of impurities from the electrode is prevented and high-purity oxygen gas is used as the raw material gas to increase the degree of purity of ozone gas, high-concentration ozone gas cannot be stably generated (see, e.g., Patent Document 1). Facing such a problem, attempts have been made by, e.g., adding a slight amount of catalytic gas such as nitrogen gas to high-purity oxygen gas. However, since a nitrogen oxide which is undesirable in manufacturing of semiconductors is generated as a by-product, there is another problem that the foregoing ozone gas generator is not suitable as an ozone gas generator intended for a semiconductor field.

For the foregoing reason, a method for stably generating high-concentration ozone gas by using only high-purity oxygen gas which does not contain catalytic gas has been desired, and the applicant of the present invention has proposed various methods (see Patent Documents 1 and 2).

According to, e.g., Patent Document 1, it has been proposed that a predetermined amount of a titanium oxide is added to a dielectric. This allows stable generation of ozone gas even if high-purity oxygen gas which does not contain catalytic gas is used. In addition, according to Patent Document 2, it has been proposed that titanium (Ti), tungsten (W), antimony (Sb), manganese (Mn), iron (Fe), cobalt (Co), nickel (Ni), vanadium (V), zinc (Zn), or an oxide thereof is effective and that powder of the foregoing component(s) is attached to a surface of a dielectric with a baking fixing agent made of glass.

CITATION LIST

Patent Document

PATENT DOCUMENT 1: Japanese Patent No. 3740254
PATENT DOCUMENT 2: Japanese Patent Publication No. 2008-156218

SUMMARY OF THE INVENTION

Technical Problem

By using the foregoing methods described in Patent Document 1 and 2, high-concentration ozone gas can be relatively generated with stability even if only high-purity oxygen gas is used as the raw material gas. However, the degree of cleanliness required in the semiconductor manufacturing facilities has been increased with an increase in functionality of the semiconductors. In association with the foregoing, higher performance has been required for the ozone gas generators used in the semiconductor manufacturing facilities.

The present inventors have proposed that a functional film made of a metal oxide of, e.g., niobium is provided on the surface of the dielectric (see, e.g., Japanese Patent Application No. 2009-205009). By providing such a functional film, high-concentration ozone gas can be more stably generated even if only high-purity oxygen gas is used as the raw material gas.

However, after a continuous operation is performed for equal to or longer than 1000 hours under rigorous conditions in order to evaluate durability of the ozone gas generator, a slight and gradual reduction in concentration of generated ozone gas is recognized in the case where the functional film is made only of the metal oxide of, e.g., niobium. The similar reduction is recognized in the case where the functional film is made only of a titanium oxide.

It is an objective of the present invention to provide an ozone gas generator which, even if only high-purity oxygen gas is used as raw material gas, can stably generate high-concentration ozone gas and has excellent durability.

Solution to the Problem

In order to accomplish the foregoing objective, a functional film containing a particular first metal oxide of, e.g., niobium and a particular second metal oxide of, e.g., titanium functioning as a photocatalyst is provided on a dielectric in an ozone gas generator of the present invention.

Specifically, the ozone gas generator of the present invention includes a pair of dielectrics arranged so as to oppose each other; a discharge gap formed between the pair of dielectrics; at least a pair of electrodes for generating discharge in the discharge gap; a raw material gas supply path for supplying raw material gas to the discharge gap; an ozone gas removal path for removing ozone gas from the discharge gap; and a functional film formed on at least one of the pair of dielectrics and facing the discharge gap.

The functional film contains the first metal oxide of one or more metals selected from a group consisting of niobium, tantalum, molybdenum, and chromium, and the second metal oxide of one or more metals selected from a group consisting of titanium, tungsten, zinc, and iron.

Note that a method using silent discharge or creeping discharge may be used. Although a pair of electrodes is enough, more than a pair of electrodes may be used. The number of pairs of electrodes can be set as necessary.

According to the ozone gas generator having the foregoing configuration, the functional film containing the particular first metal oxide of, e.g., niobium and the particular second metal oxide of, e.g., titanium (the first and second metal oxides are collectively referred to as a "composite metal oxide") is provided so as to face the discharge gap to which raw material gas is supplied and voltage is applied by the pair of electrodes to generate discharge. Thus, when ozone gas is generated from the raw material gas by the discharge, the composite metal oxide can effectively function.

Although a specific mechanism is not yet known, the composite metal oxide functioning as described above allows stable generation of high-concentration ozone gas even if only high-purity oxygen gas is used as the raw material gas. In addition, since little change in concentration of generated ozone gas is shown even if a continuous operation is performed for equal to or longer than 1000 hours under rigorous conditions, the initial concentration of generated ozone gas can be maintained.

More specifically, the functional film contains the first and second metal oxides. The amount of the first metal oxide may be 0.03-3000, where the amount of the second metal oxide is 1 as calculated in terms of molar ratio.

According to the foregoing configuration, since the first and second metal oxides are contained at a proper ratio, a unique function/effect of the functional film can be successfully provided.

The functional film may have a multilayer structure in which a layer made of the first metal oxide is stacked on a layer made of the second metal oxide.

According to the foregoing configuration, since the layer made of the first metal oxide and the layer made of the second metal oxide can be separately formed, a uniform quality can be realized across the entirety of the functional film. As a result, a high-performance functional film can be formed.

The ozone gas generator having the foregoing configuration may be manufactured by a method including the steps of forming, on the dielectric, a first metal film of metal forming the second metal oxide as a lower film by sputtering; forming, on the lower film, a second metal film of metal forming the first metal oxide as an upper film by sputtering; and bonding the pair of dielectrics together by heating and welding the pair of dielectrics opposing each other. In the method, the heating in the bonding the pair of dielectrics is performed in atmosphere containing oxygen.

According to the foregoing method, since each of the metal layers can be formed with high accuracy, a base for a thin functional film can be formed with high functionality. In addition, since the bonding of the dielectrics and the formation of the functional film by oxidizing each of the metal layers can be simultaneously performed, excellent productivity can be realized.

Advantages of the Invention

As described above, according to the present invention, high-concentration ozone gas can be stably generated for a long period of time even if only high-purity oxygen gas is used as the raw material gas. The ozone gas generator which is suitable for a use in a semiconductor field and has excellent durability can be provided.

BRIEF DESCRIPTION OF THE DRAWINGS

FIG. 6 is a table of results of a test on a relationship between an ozone concentration and a molar ratio.

DESCRIPTION OF EMBODIMENTS

An embodiment of the present invention will be described below in detail with reference to drawings. Note that the description below will be set forth merely for purposes of preferred examples in nature and it is not intended to limit the scope, applications, and use of the invention.

(Configuration of Ozone Gas Generator)

Figure 1:
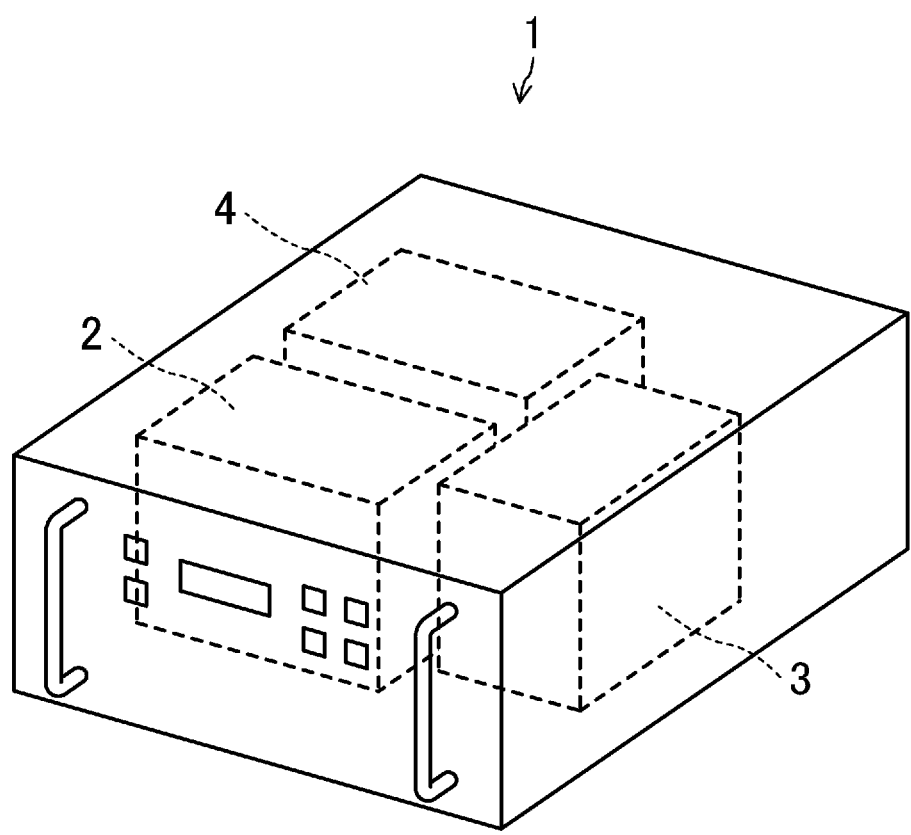
FIG. 1 is a schematic perspective view of an ozonizer.

FIG. 1 illustrates an ozonizer (ozone gas generator) 1 to which the present invention is applied. The ozonizer 1 is a model intended for a semiconductor field and is configured to stably generate high-purity ozone gas. The ozonizer 1 includes, e.g., a raw material gas supply section (raw material gas supply path) 2, an ozone gas generation section 3, and an ozone gas removal section (ozone gas removal path) 4. Further, the ozonizer 1 includes, e.g., a drive control section for driving and controlling the foregoing components and an operation section (not shown in the figure).

In the ozonizer 1, raw material gas is supplied from the raw material gas supply section 2 to the ozone gas generation section 3, and ozone gas is generated from the raw material gas in the ozone gas generation section 3. The generated ozone gas is removed from the ozonizer 1 through the ozone gas removal section 4. In, e.g., a semiconductor facility, the ozone gas removed from the ozonizer 1 is dissolved in pure water, thereby generating ozone water. The ozone water is used for, e.g., cleaning a silicon wafer.

A raw material gas supply pipe etc. (not shown in the figure) are provided in the raw material gas supply section 2. One end of the raw material gas supply pipe communicates with a supply source of the raw material gas, and the other end of the raw material gas supply pipe communicates with the ozone gas generation section 3. A material into which impurities are less likely to be mixed, e.g., metal such as stainless steel or fluorine resin, is used for the raw material gas supply pipe. Similarly, an ozone gas removal pipe is provided in the ozone gas removal section 4. Note that high-purity oxygen gas (the degree of purity of equal to or higher than 99.9%) is used as the raw material gas and catalytic gas such as nitrogen gas is not added to the raw material gas.

Figure 2:
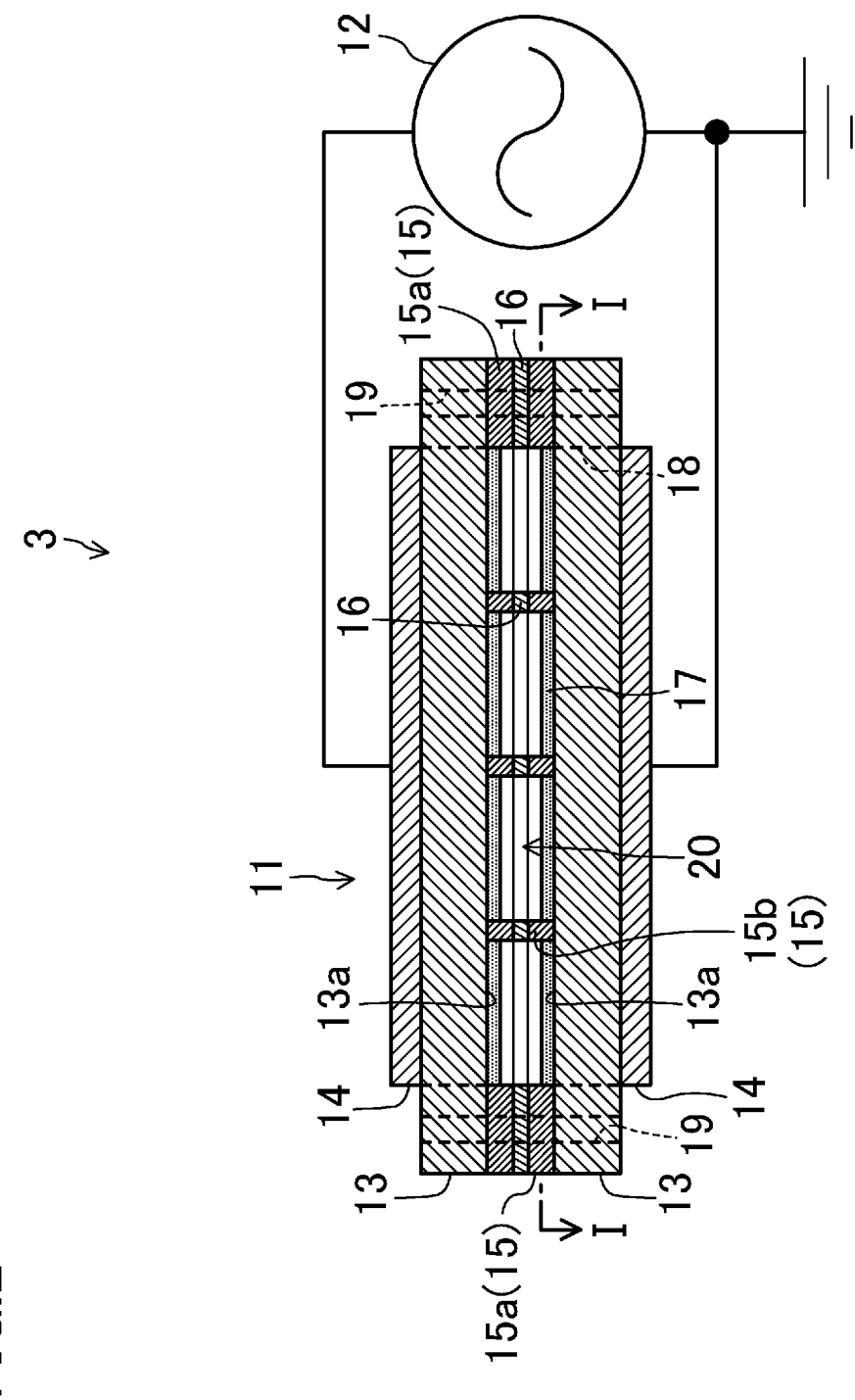
FIG. 2 is a schematic cross-sectional view of an ozone gas generation section.

FIG. 2 schematically illustrates the ozone gas generation section 3 which is a main part of the ozonizer 1. As illustrated in FIG. 2, the ozone gas generation section 3 includes a discharge cell 11, and a high-frequency high-voltage power supply 12 is connected to the discharge cell 11. The discharge cell 11 includes, e.g., dielectrics 13, electrodes 14, dividers 15, a bonding layer (meltable material) 16, and functional films 17.

Figure 3:
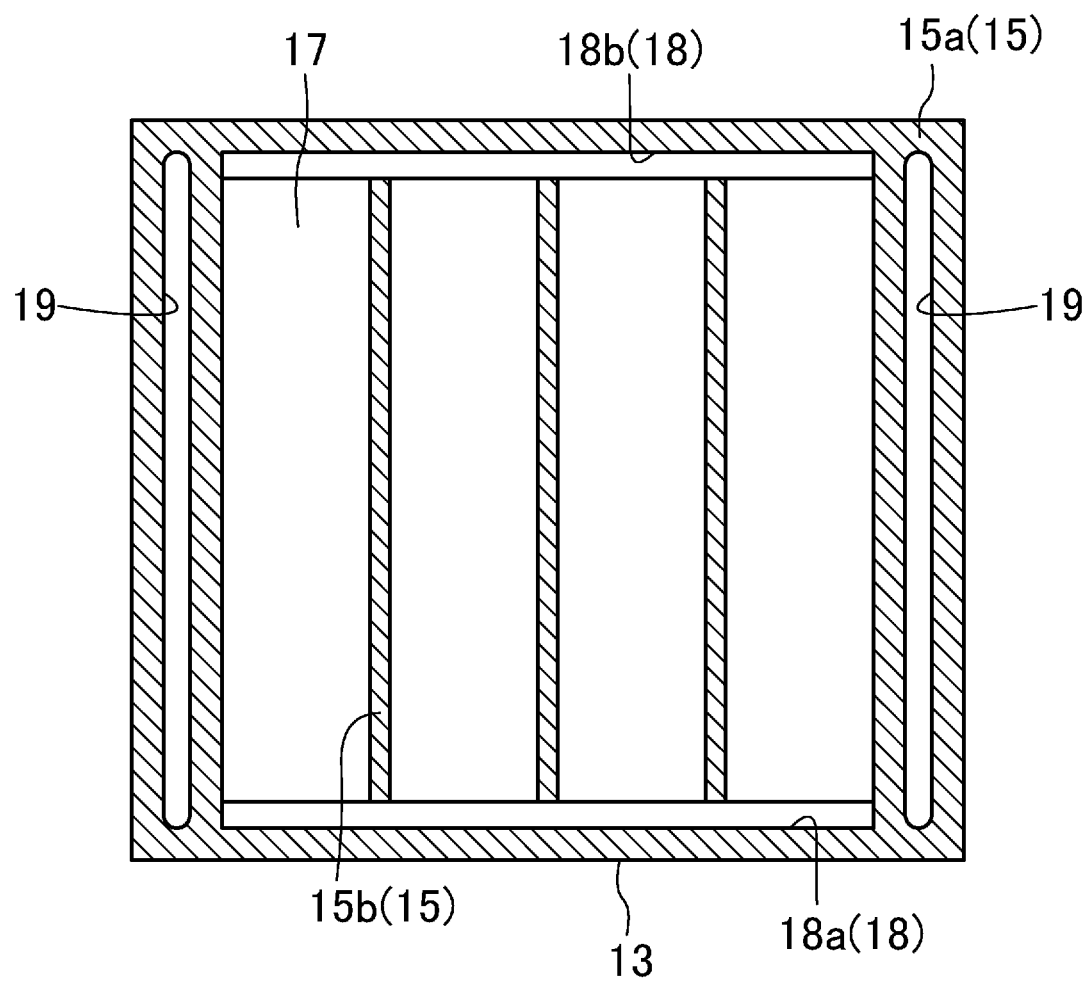
FIG. 3 is a schematic cross-sectional view of the ozone gas generation section along an I-I line of FIG. 2.

As illustrated in FIG. 3, the dielectric 13 is a rectangular plate-shaped member formed by sintering high-purity alumina. The thickness of the dielectric 13 is, e.g., 0.05-1 mm, and preferably 0.1-0.3 mm for stable performance. Band-shaped gas flow paths 18 extending along parallel ones of edges of the dielectric 13 penetrate parallel ones of end parts of the dielectric 13, respectively. One of the gas flow paths 18 communicates with the raw material gas supply section 2 and serves as part of the raw material gas supply path (as a raw material gas inlet 18a). The other gas flow path 18 communicates with the ozone gas removal section 4 and serves as part of the ozone gas removal path (as an ozone gas outlet 18b).

Band-shaped refrigerant flow paths 19 extending along the other parallel ones of the edges of the dielectric 13 penetrate the other parallel ones of the end parts of the dielectric 13, respectively. Refrigerant for cooling the discharge cell 11 flows through the refrigerant flow paths 19. A pair of dielectrics 13 opposing each other is used for a single discharge cell 11, and the opposing dielectrics 13 are arranged substantially in parallel with a slight clearance (gap) being interposed therebetween. Note that, in the present embodiment, only a single discharge cell 11 is illustrated for convenience of describing a base structure. The number of the discharge cell 11 is not limited to one, and a plurality of discharge cells 11 may be provided.

A method using silent discharge is employed for the discharge cell 11 of the present embodiment. The film-like electrode 14 which is one size smaller in lengthwise and widthwise dimensions than the dielectric 13 is provided on a back surface of the outwardly-facing dielectric 13, and the electrodes 14 are provided so as to oppose each other. One of the electrodes 14 (i.e., a high-voltage electrode) is electrically connected to one of terminals of the high-frequency high-voltage power supply 12. The other electrode 14 (i.e., a low-voltage electrode) is electrically connected to the other terminal of the high-frequency high-voltage power supply 12 connected to ground.

The divider 15 made of a glass material is provided on each of opposing surfaces 13a of the dielectrics 13. The divider 15 is stacked on the surface 13a of the dielectric 13. The divider 15 includes a surrounding part 15a provided so as to surround the surface 13a in a circumferential part thereof, and a plurality of linear rib parts 15b provided inside the surrounding part 15a. Each of the rib parts 15b is provided so as to extend from the raw material gas inlet 18a to the ozone gas outlet 18b, and adjacent ones of the rib parts 15b are arranged substantially in parallel at a predetermined interval.

The opposing dividers 15 respectively provided on the dielectrics 13 are bonded together at upper end parts thereof with the bonding layer 16 being interposed therebetween. The bonding layer 16 is made of the same glass material as that of the divider 15. A plurality of band-shaped discharge gaps 20 defined by the divider 15 are formed between the pair of dielectrics 13 bonded together as described above. The dimension of the discharge gap 20 (dimension in the direction perpendicular to the surface 13a) is set to equal to or less than 200 μm. Note that the gap dimension is preferably set to a small value, e.g., equal to or less than 50 μm.

The functional film 17 is formed on the surface 13a of the dielectric 13 forming the discharge gaps 20. Specifically, the functional film 17 is formed so as to cover each of a plurality of band-shaped parts of the surface 13a defined by the divider 15. Some contrivances have been provided for the functional film 17 of the ozonizer 1 so that high-concentration ozone gas can be stably generated for a long period of time by using only high-purity oxygen gas as the raw material gas.

Specifically, the functional film 17 contains a particular metal oxide (first metal oxide) having a catalytic function, and a particular metal oxide (second metal oxide) having a photocatalytic function (the foregoing two oxides are collectively referred to as a "composite metal oxide").

The following can be used as the first metal oxide: a metal oxide of, e.g., niobium (Nb), tantalum (Ta), molybdenum (Mo), or chromium (Cr), i.e., a niobium oxide, a tantalum oxide, a molybdenum oxide, or a chromium oxide. The first metal oxide may be any one of the foregoing metal oxides, or may be a mixture of two or more of the foregoing metal oxides. In addition, the following can be used as the second metal oxide: a metal oxide of, e.g., titanium (Ti), tungsten (W), zinc (Zn), or iron (Fe), i.e., a titanium oxide, a tungsten oxide, a zinc oxide, or an iron oxide. The second metal oxide may be also any one of the foregoing metal oxides, or may be a mixture of two or more of the foregoing metal oxides.

As in various effective materials proposed by the present inventors, emphasis has been placed on development of a function material producing a catalytic effect so that high-purity high-concentration ozone gas can be stably generated. For example, the present inventors have found that a metal oxide of, e.g., titanium, niobium, tantalum, molybdenum, or chromium produces an excellent catalytic effect for generating ozone gas.

However, when a metal oxide of, e.g., titanium or niobium is used alone, if a continuous operation is performed for more than 1000 hours under rigorous conditions in order to evaluate durability, it is likely that, although the cause is not yet known, concentration (maximum concentration) of generated ozone gas is slightly and gradually reduced. As a result of study for improvement of such a tendency, it has been found that a metal oxide of, e.g., niobium and a metal oxide of, e.g., titanium having the photocatalytic function are combined together at a predetermined ratio and therefore it is less likely that the reduction in concentration of generated ozone gas is occurred.

Figure 4:
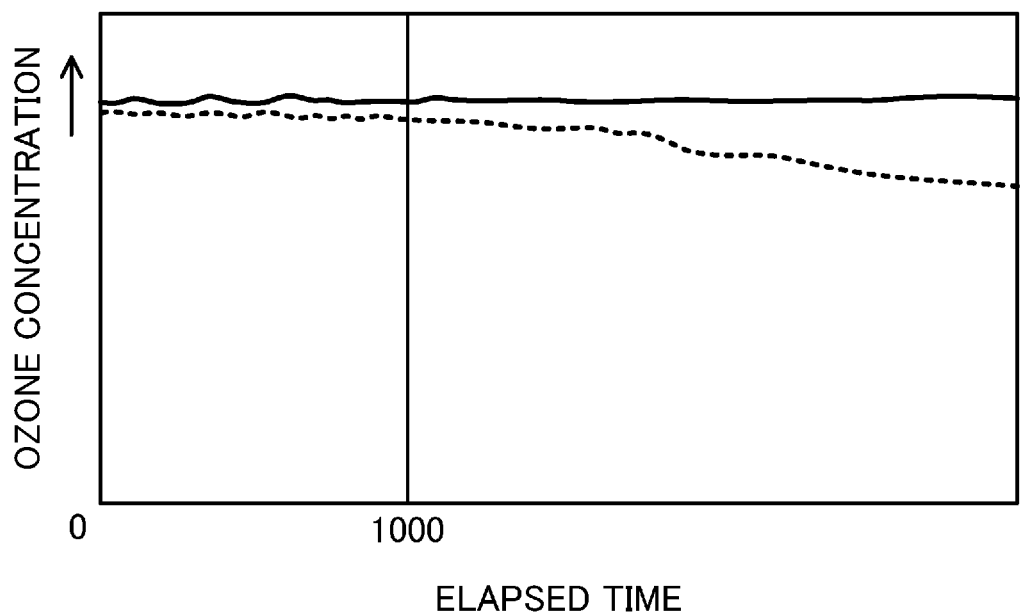
FIG. 4 is a graph illustrating a temporal change in ozone concentration. A solid line represents an example, and a dashed line represents a comparative example.

FIG. 4 illustrates one example of a temporal change in concentration of generated ozone gas when an ozonizer is continuously operated for a long period of time. In FIG. 4, a solid line represents the case (example) where a functional film contains a composite metal oxide (specifically a composite metal oxide of $Nb_2O_5$ and $TiO_2$), and a dashed line represents the case (comparative example) where a functional film contains a metal oxide (specifically a metal oxide of $Nb_2O_5$) alone. The horizontal axis represents elapsed time (h), and the vertical axis represents concentration ($g/m^3(N)$) of generated ozone gas.

As illustrated in FIG. 4, in the comparative example, when the elapsed time exceeded 1000 hours from a start of the continuous operation, the concentration of generated ozone gas was gradually reduced. On the other hand, in the example, little change from the initial concentration of generated ozone gas was shown even after the elapse of well over 1000 hours, and a predetermined high concentration of more than 300 $g/m^3$ was maintained. Thus, the functional film containing the composite metal oxide allows improvement in durability of the ozonizer.

For the foregoing reason, in the present embodiment, after a layer made of metal forming the first metal oxide, such as niobium, is stacked on a layer made of metal forming the second metal oxide, such as titanium, the stack of the layers is heated in atmosphere containing oxygen. In such a manner, the entirety of the functional film 17 is made of the composite metal oxide.

Figure 5:
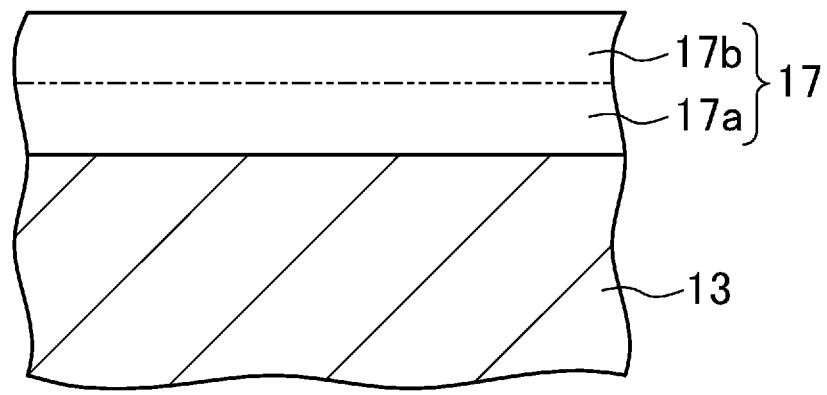
FIG. 5 is a schematic view illustrating a configuration of a functional film.

FIG. 5 illustrates a schematic view of the functional film 17. As illustrated in FIG. 5, the functional film 17 of the present embodiment includes a lower layer 17a mainly made of the second metal oxide such as a titanium oxide, and an upper layer 17b mainly made of the first metal oxide such as a niobium oxide. Note that the functional film 17 does not have a multilayer structure of the completely-separated upper and lower layers 17a and 17b and it is assumed that, e.g., part of the titanium oxide of the lower layer 17a is exposed on a surface of the upper layer 17b in the course of oxidation by heating.

The functional film is preferably formed such that, supposing that the amount of the second metal oxide is 1 as calculated in terms of molar ratio, the amount of the first metal oxide is 0.03-3000. In other words, the functional film preferably contains the first and second metal oxides at a ratio at which, supposing that the molar number of the second metal oxide is 1, the molar number of the first metal oxide falls within a range of 0.03-3000. By setting the functional film to have the foregoing ratio, the functional film can contain the first and second metal oxides at a proper ratio. Thus, a unique function/effect of the functional film can be successfully provided.

Figure 7:
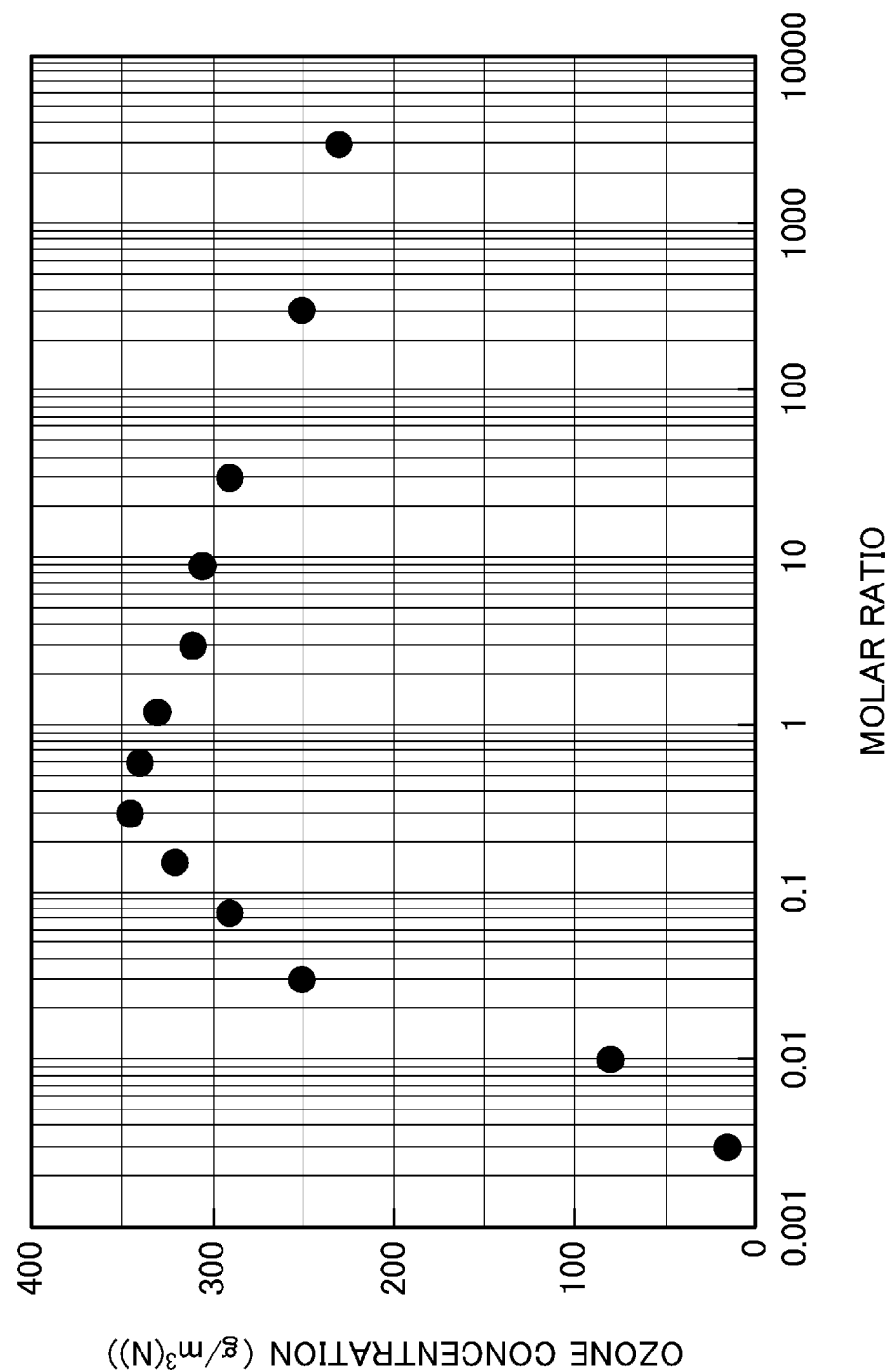
FIG. 7 is a graph illustrating the relationship of FIG. 6.

FIGS. 6 and 7 illustrate results of a test for evaluating a relationship between a molar ratio (the first metal oxide/the second metal oxide) and an ozone concentration in a stable state as one example. The test was performed for a functional film made of a niobium oxide (first metal oxide of $Nb_2O_5$) and a titanium oxide (second metal oxide of $TiO_2$). The results show a tendency that, when the molar ratio falls below 0.03, the ozone concentration is significantly reduced. A peak is located around a molar ratio of 0.1-1. As the molar ratio is increased from the peak, the ozone concentration is gradually reduced. However, an ozone concentration of equal to or higher than 200 $g/m^3$ is maintained even at a molar ratio of 3000. In particular, a high ozone concentration which is equal to or higher than 300 $g/m^3$ is maintained within a molar ratio range of 0.1-10.

The similar tendency to that of the functional film containing the titanium oxide is observed for a functional film containing a tungsten oxide, a zinc oxide, or an iron oxide. Although the ozone concentration at the peak is about 340 $g/m^3$ for the functional film containing the titanium oxide, the ozone concentration at the peak is about 300 $g/m^3$ for the functional film containing the tungsten oxide ($WO_3$), about 220 $g/m^3$ for the zinc oxide (ZnO), and about 250 $g/m^3$ for the functional film containing the iron oxide ($Fe_2O_3$).

If the first and second metal oxides are stacked one upon another to form the functional film 17 as in the present embodiment, it is preferable that, supposing that the thickness (total thickness) of the functional film 17 is 1, the thickness of the second metal oxide is set within a range of 0.1-0.6. If the thickness of the second metal oxide falls below 0.1, there is a possibility that the thickness of the second metal oxide lacks upon volume production due to variation in, e.g., film thickness upon production and therefore defective items from which predetermined performance cannot be obtained are produced. On the other hand, if the thickness of the second metal oxide exceeds 0.6, there is possibility that the first metal oxide becomes too thin and the catalytic functions unique to first and second metal oxides are degraded.

The thickness (total thickness) of the functional film 17 is preferably set within a range of 0.1-10 μm, and more preferably within a range of 0.5-1.5 μm, e.g., 1 μm. If the thickness of the functional film 17 falls below 0.1 μm, there is a possibility that proper performance cannot be provided due to variation in film formation. On the other hand, if the thickness of the functional film 17 exceeds 10 μm, there is possibility that the function of the second metal oxide of the lower layer 17a cannot be provided.

High-purity oxygen gas is supplied from the raw material gas supply section 2 to the discharge gaps 20 of the discharge cell 11 configured as described above through the raw material gas inlet 18a. Then, when high voltage is applied between the pair of electrodes 14, silent discharge is generated in the discharge gaps 20. Ozone gas having a stable concentration is generated in the discharge gaps 20 by the action of the silent discharge and the functional film 17 facing the discharge gaps 20. Subsequently, high-purity ozone gas is sent out from the ozonizer 1 through the ozone gas outlet 18b and the ozone gas removal section 4.

(Method for Manufacturing Ozone Gas Generator)

Figure 8:
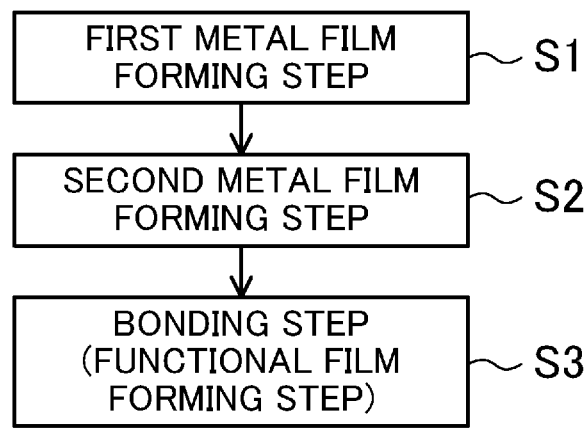
FIG. 8 is a flow chart illustrating steps in manufacturing of an ozone gas generator.

The discharge cell 11 which is the main part of the ozonizer 1 can be easily manufactured by a method including a first metal film forming step, a second metal film forming step, and a bonding step as described below (see FIG. 8).

First, a film (lower film) made of metal forming a second metal oxide, such as titanium, is formed on a dielectric 13 by sputtering (first metal film forming step S1). Specifically, after a divider 15 is provided on a surface 13a of the dielectric 13, a metal film made of, e.g., a predetermined amount of titanium is formed on a predetermined part of the surface 13a by using, e.g., a mask.

Subsequently, by performing the similar process to that for the lower film, a film (upper film) made of a predetermined amount of metal forming a first metal oxide, such as niobium, is formed on the lower film, and then a metal film (multilayer metal film) having multiple layers is formed (second metal film forming step S2). The films are stacked one upon another by repeating the sputtering as described above, thereby relatively easily forming even a thin multilayer metal film with high accuracy. As a result, since a gap dimension can be set to a smaller value, there is an advantage that higher-concentration ozone gas can be stably generated.

The divider 15 can be formed by applying a glass material to the dielectric 13 and sintering the glass material. Specifically, paste of the glass material is applied to a predetermined part of the surface 13a of the dielectric 13 by screen printing. Subsequently, the paste of the glass material is sintered at a predetermined temperature of equal to or higher than 800° C., at which the glass material is melted, for a predetermined period of time, followed by cooling and solidifying of the paste of the glass material. The application and sintering of the glass material may be repeated to form the divider 15.

Next, after a pair of dielectrics 13 is arranged so as to oppose each other with a meltable material being interposed therebetween, the pair of dielectrics 13 is bonded together by heating (bonding step S3). As the meltable material, e.g., paste of the same glass material as that of the divider 15 may be used. Specifically, the meltable material is applied to an upper end part of the divider 15 provided on each of the surfaces 13a of the dielectrics 13, and the upper end parts of the dividers 15 comes into close contact with each other. Then, the meltable material is heated to a predetermined temperature of equal to or higher than 800° C., at which the meltable material is melted, and is sintered for a predetermined period of time.

At this point, the sintering is performed in atmosphere containing oxygen, and heating conditions are adjusted such that the entirety of the multilayer metal film is oxidized (functional film forming step). By cooling the meltable material after the sintering, the meltable material is solidified to form a bonding layer 16, and the pair of dielectrics 13 is bonded together. The multilayer metal film is oxidized, thereby forming a functional film 17 substantially entirely made of a composite metal oxide. That is, since the bonding of the dielectrics 13 and the formation of the functional film 17 can be simultaneously performed, the number of process steps can be reduced and excellent productivity can be realized.

Note that the ozone gas generator of the present invention is not limited to the foregoing embodiment, and various configurations other than the foregoing may be applied.

Figure 9:
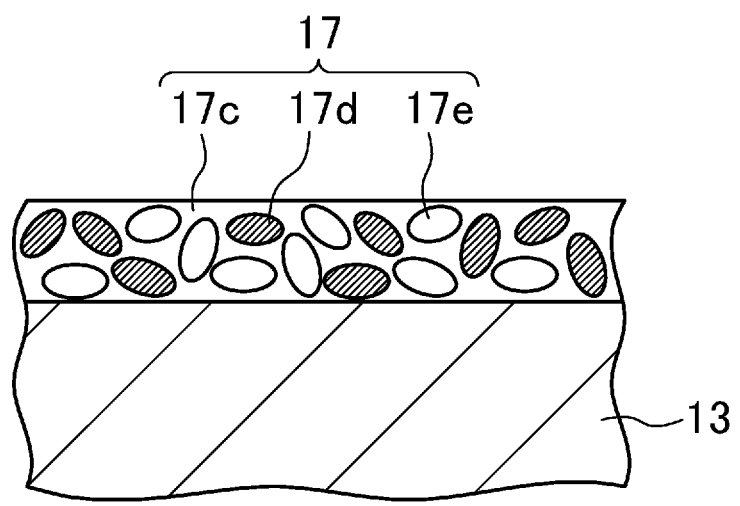
FIG. 9 is a schematic view illustrating a configuration of a variation of the functional film.

As illustrated in, e.g., FIG. 9, fine particles 17d of metal forming a first metal oxide, such as niobium, or the fine particles 17d of the first metal oxide such as a niobium oxide and fine particles 17e of metal forming a second metal oxide, such as titanium, or the fine particles 17e of the second metal oxide such as a titanium oxide are mixed with paste 17c of a glass material at a predetermined ratio. Then, the mixture is applied by screen printing and is sintered. In such a manner, a functional film 17 can be formed. Alternatively, oxygen gas may be introduced upon sputtering, thereby directly forming a functional film 17 made of a metal oxide on a dielectric 13.

As another alternative, a functional film 17 may be provided only on one of dielectrics 13. A divider 15 may be formed only on one of dielectrics 13, and may be directly welded to the other dielectric 13 with a meltable material being interposed therebetween. A discharge method is not limited to the method using silent discharge, and a method using creeping discharge may be employed. The ozone gas generator is not limited to a use as a standalone device, and may be used as, e.g., a component incorporated into an ozone water producing device.

DESCRIPTION OF REFERENCE CHARACTERS

1 Ozonizer (Ozone Gas Generator)
2 Raw Material Gas Supply Section (Raw Material Gas Supply Path)
3 Ozone Gas Generation Section
4 Ozone Gas Removal Section (Ozone Gas Removal Path)
11 Discharge Cell
12 High-Frequency High-Voltage Power Supply
13 Dielectric
13a Surface
14 Electrode
15 Divider
16 Bonding Layer (Meltable Material)
17 Functional Film
17a Lower Layer
17b Upper Layer
20 Discharge Gap

The invention claimed is:

1. An ozone gas generator, comprising:
a pair of dielectrics arranged so as to oppose each other and form a discharge gap between the pair of dielectrics;
at least a pair of electrodes for generating discharge in the discharge gap;
a single raw material supply, the single raw material supply containing only high-purity oxygen gas to which no catalytic gas and no other types of gas are added and which has a degree of purity of equal to or higher than 99.9%;
a raw material gas supply path for supplying the raw material gas from the single raw material supply to the discharge gap;
an ozone gas removal path for removing ozone gas from the discharge gap; and
a functional film formed on at least one of the pair of dielectrics and facing the discharge gap, wherein
the functional film contains
a first metal oxide of niobium, and
a second metal oxide of one or more metals selected from a group consisting of titanium, tungsten, zinc, and iron.

2. The ozone gas generator of claim 1, wherein
the functional film has a multilayer structure in which a layer made of the first metal oxide is stacked on a layer made of the second metal oxide; and
the layer made of the first metal oxide faces the discharge gap.

3. The ozone gas generator of claim 1, wherein the functional film comprises particles of the first metal oxide and particles of the second metal oxide dispersed in a glass material at a predetermined ratio.

4. The ozone gas generator of claim 1, wherein
the first metal oxide is exposed at a surface of the functional film.

5. The ozone generator of claim 1, wherein
the pair of dielectrics are bonded together with a glass-based material which is melted and sintered.

6. The ozone generator of claim 1, wherein
the functional film contains the first metal oxide at an amount of 0.03-3000, where an amount of the second metal oxide is 1 as calculated in terms of molar ratio.

* * * * *